Patented June 24, 1941

2,246,842

UNITED STATES PATENT OFFICE 2,246,842

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application June 27, 1940, Serial No. 342,732

10 Claims. (Cl. 252—344)

This invention relates primarily to the treatment of emulsions of mineral oil and water, such as petroleum emulsions, for the purpose of separating the oil from the water.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The demulsifier or demulsifying agent employed in my process consists of a surface-active amine containing at least one hydrocarbon radical having more than eight carbon atoms, and not more than 32 carbon atoms, and directly linked to an amino nitrogen atom. Such amines often indicate their surface activity by the fact that they dissolve in water to give a solution or sol which froths or foams so as to show that the surface tension of water has been markedly reduced. This applies, of course, even though the amines are added in relatively small amounts, such as a few tenths to a few hundredths of a percent or less. On contact with water, presumably the amine combines with water, so as to form the corresponding base, and thus the surface activity is due to the base, rather than the free amine. The base may, of course, be considered as the salt of water, if one looks upon water as being an acid. Similarly, one is not limited to amines of the kind where the base shows surface activity; but one may employ amines of the kind in which some selected salt such as the acetate, lactate, chloride, nitrate, citrate, sulfate, etc., may show activity. In other words, there are amines which are relatively insoluble in water, but which will dissolve in dilute acetic acid, lactic acid, hydrochloric acid, or the like, to produce a surface-active salt.

For the sake of brevity, reference will be made to the amine, but it is understood that it is immaterial whether the amine is used as such, or whether it is used after contact with water, such as the base form, or if it is used in some other convenient salt form, such as the compound formed by reaction with acetic acid, lactic acid, hydrochloric acid, or the like. Such amines, in essence, are characterized by the fact that they furnish surface-active positive ions in solutions or sols of the kind mentioned. See U. S. Patent No. 2,132,902, to Lenher, dated Oct. 11, 1938. In actual breaking of oil field emulsions or the like, it is possible that one might use an amine under such conditions that might not necessarily involve contact with water or with any acidic body. Even so, it appears that the simplest brief characterization of the members of the contemplated class is a surface-active positive ion-containing amine, of the kind characterized by the fact that there is present at least one hydrocarbon radical having more than eight carbon atoms, and not more than 32 carbon atoms, and further characterized by being directly linked to an amino nitrogen atom.

Further consideration of the class of compounds contemplated as demulsifiers is that all amino nitrogen atoms present must be basic. It is known, of course, that if an amino nitrogen atom is directly linked to an acyl radical, or to an aryl radical, such amines have relatively little or no basicity; the arylamines being extremely weakly basic, and the amides generally even less basic. Thus, it is intended that the amines herein contemplated as demulsifiers shall be basic, in respect to all amino nitrogen atoms present, which will be indicated by being free from acyl and aryl radicals. Thus, there may be attached to the amino nitrogen atom one or two hydrogen atoms, alkyl radicals containing less than eight carbon atoms, hydroxyalkyl radicals, alkoxyalkylene radicals, aralkyl radicals, and alicyclic radicals. As will be pointed out, it is my preference to use monoamines, because they are more readily available; but one may employ polyamines, as will be indicated subsequently. It is not intended to include oxyalkylation derivatives of amines, such as those derived by reaction with ethylene oxide, and characterized by the multiple recurrence of the ether linkage, for instance, 3, 4, or more times.

Amines of the kind described are produced in various manners. They may be produced from naphthenic acids, resin acids, fatty acids, oxidized petroleum acids, or the like, by converting the acid into the ester, preferably the ethyl ester or the like, and then converting the ester into the alcohol. Such alcohols, derived from various fatty acids, naphthenic acids, oxidized petroleum acids, resin acids, and the like, are available commercially and are employed in the manufacture of wetting agents or the like by sulfating or sulfonating such alcohols. Such high molal alcohols can be converted into the chlorides, and the chlorides reacted with ammonia or a primary or secondary amine to give amines of the type herein contemplated. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid or some other hydroxy acid, such as hydroxystearic acid, one would have a hydroxylated hydrocarbon radical.

In actual practice amines of the kind herein contemplated can be obtained in various ways. Reference is made to a number of patents which disclose or describe such amines, or the method of manufacturing the same. In some cases obvious modifications will be required to produce amines of the kind contemplated; but such modifications would be evident to a skilled chemist, without further discussion. See the following patents: U. S. Patent No. 1,951,469, Bertsch, Mar. 20, 1934; No. 2,006,058, Olin, June 25, 1935; No. 2,033,866, Schrauth, Mar. 10, 1936; No. 2,074,380, Flett, Mar. 23, 1937; No. 2,075,825, Nafash, Apr. 6, 1937; No. 2,078,922, Arnold, May 4, 1937; No. 2,091,105, Pigott, Aug. 24, 1937; No. 2,108,147, Speer, Feb. 15, 1938; No. 2,110,199, Carothers, Mar. 8, 1938; No. 2,132,902, Lenher, Oct. 11, 1938, and No. 2,178,522, Ralston, Oct. 31, 1938. British Patent No. 359,001 to Johnson, on behalf of I. G. Farbenindustrie, A.-G., 1932, and British Patent No. 358,114 to Carpmael, on behalf of I. G. Farbenindustrie, A.-G., 1932. See also Industrial & Engineering Chemistry, industrial edition, volume 32, No. 4 (1940), page 486.

Suitable amines can be obtained by introducing hydrocarbon or oxyhydrocarbon groups, for instance, the hydrophobe part of the ricinoleic acid radical, into amines such as ethylene diamine, hydroxyethylene diamine, diethylene triamine, tetraethylene pentamine, triethylene tetramine, etc. Such amines, of course, can react with the high molal halides, so as to produce compounds of the kind contemplated. Morpholine may be included. The same procedure may be employed as is used in connection with the various monoamines.

In view of what has been said, it will be noted that the group introduced into the amine and derived at least hypothetically from an acid is really the carbon chain radical of the acyl group of the acid or hypothetical acid, along with what was at least hypothetically the carbonyl carbon atom. For the sake of convenience, this radical will be referred to as a hydrocarbon radical; and it is intended to include derivatives in which a hydrogen atom or a small number of hydrogen atoms have been replaced by the hydroxyl radical; for instance, the hydroxy hydrocarbon radical which would be supplied by ricinoleic acid, hydroxystearic acid, dihydroxystearic acid, or the like. In the present instance such usage seems eminently correct, in that the hydrocarbon radical supplies the hydrophobe portion of the amine, and this hydrophobe portion is not changed markedly by the presence of one or two hydroxyl groups, as are present in the case of ricinoleic acid, hydroxystearic acid, or the like; and such hydroxyl groups are essentially non-functional, in that they are not relied upon to supply points of chemical activity. They may slightly decrease the hydrophobe character of the radical to some degree; but this cannot be significant, as can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon" is intended to include the hydroxy-hydrocarbon type of the kind in which the hydroxyl group does not materially reduce the hydrophobe character of the hydrocarbon group, as, for example, the group or radical which would be obtained from ricinoleic acid.

The patents previously referred to indicate a large number of suitable amines which are the type previously specified. For the sake of brevity reference will be made only to certain primary amines. Obviously, secondary or tertiary amines could be derived from such primary amines by introducing alkyl groups having less than eight carbon atoms, such as methyl, ethyl, propyl, butyl groups and the like; or one might introduce radicals in which the carbon atom chain was interrupted at least once by oxygen, as, for example, radicals derived by reacting an amine with compounds, such as $C_2H_5OC_2H_4Cl$ or $OHC_2H_4OC_2H_4Cl$. An aralkyl group, such as a benzyl group, might be introduced, or an alicyclic group, such as a cyclohexyl group.

The primary amines which may be used as such or converted into secondary or tertiary amines include the following: octadecenylamine; cetylamine; stearylamine; oleoamine; ricinoleoamine; amines derived from naphthenic acids; amines derived from octadecadiene 9,11-acid-1; octadecylamine; amines derived from mixed unsaturated fatty acids, such as soybean fatty acids; cottonseed oil fatty acids; linseed oil fatty acids; heptadecylamine, hexadecylamine; dodecylamine; decylamine; etc.

It has been previously pointed out that the amines may be used as such, or after contact with water, or in the form of a salt. For the sake of brevity, in the hereto appended claims, reference will simply be made to the amine, because ordinarily in contact with an emulsion in the course of dehydration, the amine would be converted to the base form; and it is understood that instead of the base form, i. e., the hydroxylated form, one could employ any other salt form, as has been indicated.

Insofar as the type of amines indicated constitutes a rather broad class, it may be well to indicate the type which I have found most desirable for purposes of breaking emulsions of the kind contemplated. My preference is to use a monoamine, rather than a polyamine. My preference, furthermore, is to use an amine in which there is only one long carbon atom chain or the like. Furthermore, my preference is to use a primary amine, rather than a secondary or tertiary amine. It is my preference that the hydrophobe carbon atom chain be derived from a detergent-forming acid, i. e., monocarboxy acids, which combine with alkalies to produce soaps or soap-like bodies; and more particularly, it is my preference that such hydrophobe portion be obtained from a higher fatty acid. Other detergent-forming acids include naphthenic acids, resin acids, such as abietic acid, the oxidized petroleum acids, etc. Such hydrophobe portions, particularly when derived from higher fatty acids, contain at least ten and not more than 20 carbon atoms. Of the various fatty acids, I particularly prefer the unsaturated fatty acids, and most especially, the hydroxylated unsaturated fatty acids of the kind exemplified by ricinoleic acid. My preferred reagent is the primary amine derived from ricinoleic acid, i. e., ricinoleoamine. If desired, such amine can be converted into a secondary or tertiary amine, by reaction with ethyl chloride, glycol chlorhydrin, or any one of a number of other suitable reagents; however, as stated, I prefer to use ricinoleoamine, as such, and further prefer to use it without conversion into a salt, such as the acetate or lactate.

Reference to the use of the amine in salt form is intended to refer to salts of the kind exemplified by the chloride, acetate or lactate, i. e., salts derived from inorganic acids or organic acids which are not surface-active per se, thus excluding high molal sulfonic acids or organic acids having at least 8 carbon atoms, such as the higher fatty acids, which, although not surface-active per se, combine readily with alkalies to produce surface-active salts such as the ordinary soaps. It is understood that such combination of the amine and anion derived from a surface-active acid is excluded from the scope of the hereto attached claims.

Conventional demulsifying agents employed in the treatment of oil field emulsions are used as such, or after dilution with any suitable solvent, such as water-petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such apparent insolubility in oil and water is not significant, because said reagents undoubtedly have solubility within the concentration employed. This same fact is true in regard to the material or materials employed as the demulsifying agent of our process.

I desire to point out that the superiority of the reagent or demulsifying agent contemplated in my process is based upon its ability to treat certain emulsions more advantageously, and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible, when the demulsifier is used in connection with acidification of calcareous oil-bearing strata, especially if suspended in or dissolved in the acid employed for acidification.

Attention is directed to the fact that in the hereto appended claims it is intended to contemplate only the use of emulsions of the kind in which surface-activity, as far as it is a function of a hydrophobe group, is contributed solely by a hydrocarbon group, as previously illustrated, or the like (thus including certain hydroxy hydrocarbon radicals as described). Such groups include alkyl groups, or the like. It is not intended to include such instances where the hydrophobe character is introduced in part by an acyl radical, for example, the acyl radical of an amido group, or the acyl radical of an ester group, as, for example, in the radical

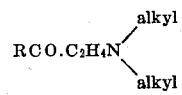

Having thus described my invention, what I claim as new and desire to secure by Letters Patent is:

1. A process for breaking petroleum emulsions of the water-in-oil type, which consists in subjecting the emulsion to the action of a demulsifier comprising a surface-active positive ion-containing amine characterized by the fact that there is directly linked to an amino nitrogen atom at least one hydrocarbon radical containing the carbon atom chain of an acyl radical of a detergent-forming monocarboxy acid having more than eight carbon atoms and not more than thirty-two carbon atoms; said amine being further characterized by freedom from acyl radicals, nitrogen-linked aryl radicals and aliphatic radicals in which ether linkages occur at least three times.

2. A process for breaking petroleum emulsions of the water-in-oil type, which consists in subjecting the emulsion to the action of a demulsifier comprising a surface-active positive ion-containing amine of the monoamine type characterized by the fact that there is directly linked to an amino nitrogen atom at least one hydrocarbon radical containing the carbon atom chain of an acyl radical of a detergent-forming monocarboxy acid having more than eight carbon atoms and not more than thirty-two carbon atoms; said amine being further characterized by freedom from acyl radicals, nitrogen-linked aryl radicals and aliphatic radicals in which ether linkages occur at least three times.

3. A process for breaking petroleum emulsions of the water-in-oil type, which consists in subjecting the emulsion to the action of a demulsifier comprising a surface-active positive ion-containing amine of the monoamine type characterized by the fact that there is directly linked to an amino nitrogen atom one and only one hydrocarbon radical containing the carbon atom chain of an acyl radical of a detergent-forming monocarboxy acid having more than eight carbon atoms and not more than thirty-two carbon atoms; said amine being further characterized by freedom from acyl radicals, nitrogen-linked aryl radicals and aliphatic radicals in which ether linkages occur at least three times.

4. A process for breaking petroleum emulsions of the water-in-oil type, which consists in subjecting the emulsion to the action of a demulsifier comprising a surface-active positive ion-containing amine of the monoamine type characterized by the fact that there is directly linked to an amino nitrogen atom one and only one hydrocarbon radical containing the carbon atom chain of an acyl radical of a fatty acid having more than eight carbon atoms and not more than thirty-two carbon atoms; said amine being further characterized by freedom from acyl radicals, nitrogen-linked aryl radicals and aliphatic radicals in which ether linkages occur at least three times.

5. A process for breaking petroleum emulsions of the water-in-oil type, which consists in subjecting the emulsion to the action of a demulsifier comprising a surface-active positive ion-containing amine of the monoamine type characterized by the fact that there is directly linked to an amino nitrogen atom one and only one hydrocarbon radical containing the carbon atom chain of an acyl radical of an unsaturated fatty acid having more than eight carbon atoms and not more than thirty-two carbon atoms; said amine being further characterized by freedom from acyl radicals, nitrogen-linked aryl radicals and aliphatic radicals in which ether linkages occur at least three times.

6. A process for breaking petroleum emulsions of the water-in-oil type, which consists in subjecting the emulsion to the action of a demulsifier comprising a surface-active positive ion-containing amine of the monoamine type characterized by the fact that there is directly linked to an amino nitrogen atom one and only one hydrocarbon radical containing the carbon atom chain of an acyl radical of ricinoleic acid; said amine being further characterized by freedom from acyl radicals, nitrogen-linked aryl radicals and aliphatic radicals in which ether linkages occur at least three times.

7. A process for breaking petroleum emulsions of the water-in-oil type, which consists in subjecting the emulsion to the action of a demulsifier comprising a surface-active positive ion-containing amine of the monoamino tertiary amine type characterized by the fact that there is directly linked to an amino nitrogen atom one and only one hydrocarbon radical containing the carbon atom chain of an acyl radical of ricinoleic acid; said amine being further characterized by freedom from acyl radicals, nitrogen-linked aryl radicals and aliphatic radicals in which ether linkages occur at least three times.

8. A process for breaking petroleum emulsions of the water-in-oil type, which consists in subjecting the emulsion to the action of a demulsifier comprising a surface-active positive ion-containing amine of the monoamino secondary amine type characterized by the fact that there is directly linked to an amino nitrogen atom one and only one hydrocarbon radical containing the carbon atom chain of an acyl radical of ricinoleic acid; said amine being further characterized by freedom from acyl radicals, nitrogen-linked aryl radicals and aliphatic radicals in which ether linkages occur at least three times.

9. A process for breaking petroleum emulsions of the water-in-oil type, which consists in subjecting the emulsion to the action of a demulsifier comprising a surface-active positive ion-containing amine of the monoamino primary amine type characterized by the fact that there is directly linked to an amino nitrogen atom one and only one hydrocarbon radical containing the carbon atom chain of an acyl radical of ricinoleic acid; said amine being further characterized by freedom from acyl radicals, nitrogen-linked aryl radicals and aliphatic radicals in which ether linkages occur at least three times.

10. A process for breaking petroleum emulsions of the water-in-oil type, which consists of subjecting the emulsion to the action of a demulsifier comprising

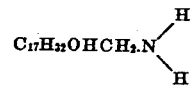

in unneutralized form.

MELVIN DE GROOTE.